(12) United States Patent
Tang et al.

(10) Patent No.: US 11,419,095 B2
(45) Date of Patent: Aug. 16, 2022

(54) DATA TRANSMISSION METHOD, TERMINAL DEVICE, NETWORK DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 78 days.

(21) Appl. No.: 16/917,651

(22) Filed: Jun. 30, 2020

(65) Prior Publication Data

US 2020/0337023 A1    Oct. 22, 2020

Related U.S. Application Data

(63) Continuation of application No. PCT/CN2018/115507, filed on Nov. 14, 2018.

(30) Foreign Application Priority Data

Jan. 4, 2018    (CN) ................. PCT/CN2018/071306

(51) Int. Cl.
*H04W 72/02*    (2009.01)
*H04W 4/40*    (2018.01)
(Continued)

(52) U.S. Cl.
CPC ............. *H04W 72/02* (2013.01); *H04W 4/40* (2018.02); *H04W 72/005* (2013.01); *H04W 92/18* (2013.01)

(58) Field of Classification Search
None
See application file for complete search history.

(56) References Cited

U.S. PATENT DOCUMENTS

2010/0034152 A1    2/2010 Imamura
2018/0249470 A1*   8/2018 Seo ...................... H04W 72/02
(Continued)

FOREIGN PATENT DOCUMENTS

CN    101438611 A    5/2009
CN    101500308 A    8/2009
(Continued)

OTHER PUBLICATIONS

AT & T. "3GPPTSG RANW1I Meeting#90bis. RI-1718400." Waveform Selection Mechanisms for DFTsOFDM, Oct. 3, 2017 (Oct. 3, 2017), pp. 1-6. http://www.3gpp.org/ftp/TSG_RAN!WG1_RL1/TSGR1_90b/Docs/R1-1718400.zip.
(Continued)

*Primary Examiner* — Rebecca E Song
(74) *Attorney, Agent, or Firm* — Perkins Coie LLP

(57) ABSTRACT

Disclosed in the present invention are a data transmission method, a terminal device, a network device and a computer storage medium. The method includes: determining, by the terminal device, a transmission waveform used by a first channel; and performing, by the terminal device, data transmission on the first channel according to the transmission waveform.

4 Claims, 3 Drawing Sheets

(51) Int. Cl.
*H04W 72/00* (2009.01)
*H04W 92/18* (2009.01)

(56) References Cited

U.S. PATENT DOCUMENTS

| | | | |
|---|---|---|---|
| 2018/0302889 A1* | 10/2018 | Guo | H04B 7/088 |
| 2019/0296954 A1* | 9/2019 | Xing | H04W 92/10 |
| 2019/0356451 A1* | 11/2019 | Zhang | H04B 17/327 |
| 2021/0281455 A1* | 9/2021 | Lee | H04L 27/2602 |

FOREIGN PATENT DOCUMENTS

| | | | |
|---|---|---|---|
| CN | 102349273 A | 2/2012 | |
| CN | 106549889 A | 3/2017 | |
| CN | 106856670 A | 6/2017 | |

OTHER PUBLICATIONS

Guangdong OPPO Mobile Telecom. "3GPP TSG RAN WG1 Meeting #87, RI-1611705" Waveform Selection for Uplink Control Signal, Nov. 4, 2016 (Nov. 4, 2016), pp. 1-4, http://www.3gpp.org/ftp/tsg_ran/WG I_RL1/TSGR1_87/Docs/R1-161 I 705.zip.

International Search Report dated Feb. 3, 2019 of PCT/CN2018/115507 (6 pages).

International Search Report dated Apr. 27, 2018 of PCT/CN2018/071306 (4 pages).

OPPO,. "3GPP TSG RAN WG1 Meeting 90bis, R1-1718776," Discussion on the UL Waveform Indication Method, Oct. 4, 2017 (Oct. 4, 2017), pp. 1-4 , http://www.3gpp.org/ftp/TSG_RAN!WG1_RL1/TSGR1_90b/Docs/RI-1718776.zip.

CATT "Discussion on NR 4-step RA Procedure" 3GPP Draft; R1-1700185, vol. RAN WG1, Spokane, USA, Jan. 10, 2017. XP051202690. 4 pages.

EPO, Partial Supplementary European Search Report for European Patent Application No. 18897990.0. Mail Date: 25 pages.

Samsung "Procedures for UL Transmissions" 3GPP Draft; R1-1717665, vol. RAN WG1, Prague, CZ, Oct. 2, 2017. XP051352265. 10 pages.

* cited by examiner

DATA TRANSMISSION METHOD, TERMINAL DEVICE, NETWORK DEVICE, AND COMPUTER STORAGE MEDIUM

CROSS-REFERENCE TO RELATED APPLICATION

This application is a continuation application of International Application No. PCT/CN2018/115507 filed on Nov. 14, 2018, which claims priority to PCT Application No. PCT/CN2018/071306 filed on Jan. 4, 2018, and the entire disclosures of both applications are hereby incorporated by reference.

TECHNICAL FIELD

The present invention relates to the technical field of information processing, in particular to a data transmission method, a terminal device, a network device and a computer storage medium.

BACKGROUND

An Internet of Vehicles system is a sidelink (SL) transmission technology based on Long Term Evolution-Device to Device (LTE-D2D). In the 3rd Generation Partnership Project (3GPP) Rel-14, a Vehicle to Everything (V2X) technology is standardized and two transmission modes are defined, which are mode 3 and mode 4. In mode 3, as shown in FIG. 1, transmission resources of a vehicle user equipment are allocated by a base station, and the vehicle user equipment performs data transmission on a sidelink according to the resources allocated by the base station. In mode 4, as shown in FIG. 2, the vehicle user equipment adopts a transmission mode of sensing and reservation. The vehicle user equipment acquires a set of available transmission resources in a resource pool through sensing, and the vehicle user equipment randomly selects a resource from the set to perform data transmission.

In NR-V2X, automatic driving is required to be supported, so higher requirements are put forward for data interchange between vehicles. In a 5G NR system, two transmission waveforms are supported on uplink, which are Cyclic Prefix OFDM (CP-OFDM) and Discrete Fourier Transform OFDM (DFT-OFDM). V2X of Rel-14 continues to use an LTE uplink transmission waveform, which adopts the DFT-OFDM. In NR-V2X, for more flexible resource configuration, two transmission waveform structures similar to those of uplink of 5G NR, i.e., CP-OFDM and DFT-OFDM may be adopted. However, in a V2X system, if the above two transmission waveforms are adopted, how to select a transmission waveform when data are sent and by which transmission waveform a receiving end performs data reception are problems to be solved.

SUMMARY

To solve the above technical problems, implementations of the present invention provide a data transmission method, a terminal device, a network device and a computer storage medium.

An implementation of the present invention provides a data transmission method. The method includes that a terminal device determines a transmission waveform used by a first channel, and the terminal device performs data transmission on the first channel according to the transmission waveform.

An implementation of the present invention provides a data transmission method. The method includes that a network device determines configuration information, wherein the configuration information is used for indicating a transmission waveform used by a first channel of a terminal device, and the network device sends the configuration information to the terminal device.

An implementation of the present invention provides a terminal device, including: a first processing unit, which determines a transmission waveform used by a first channel, and a first communication unit, which performs data transmission on the first channel according to the transmission waveform.

An implementation of the present invention provides a network device, including: a second processing unit, which determines configuration information, wherein the configuration information is used for indicating a transmission waveform used by a first channel of a terminal device, and a second communication unit, which sends the configuration information to the terminal device.

An implementation of the present invention provides a terminal device, including: a processor and a memory for storing a computer program that is capable of being run on the processor. Herein, the processor is configured to, when running the computer program, perform acts of the above method.

An implementation of the present invention provides a network device, including: a processor and a memory for storing a computer program that is capable of being run on the processor. Herein, the processor is configured to, when running the computer program, perform acts of the above method.

An implementation of the present invention provides a computer storage medium, the computer storage medium stores computer-executable instructions, and when the computer-executable instructions are executed, acts of the above method are performed.

DETAILED DESCRIPTION

To understand features and technical contents of implementations of the present invention in more detail, implementations of the implementations of the present invention will be described in detail below with reference to accompanying drawings, and the accompanying drawings are used for reference only and are not intended to limit the implementations of the present invention.

Implementation One

Figure 1:
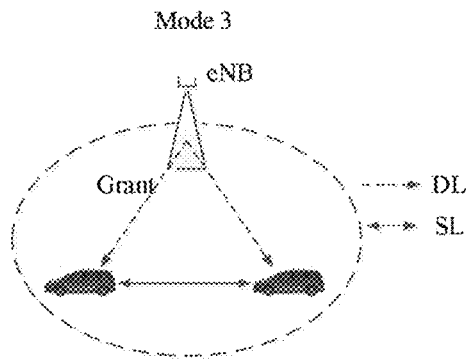
FIG. 1 is a schematic diagram one of a transmission architecture in an Internet of Vehicles.
Figure 2:
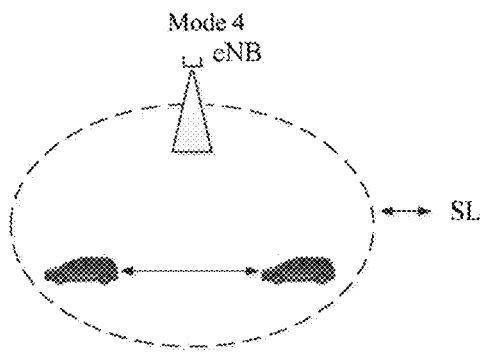
FIG. 2 is a schematic diagram two of a transmission architecture in an Internet of Vehicles.
Figure 3:
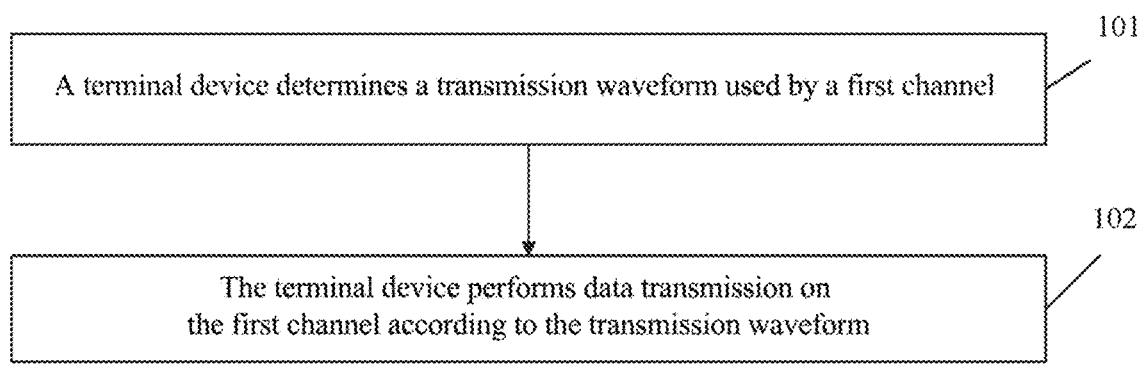
FIG. 3 is a schematic flowchart one of a data transmission method according to an implementation of the present invention.

An implementation of the present invention provides a data transmission method. As shown in FIG. 3, the method includes acts 101 and 102.

In act 101, a terminal device determines a transmission waveform used by a first channel.

In act 102, the terminal device performs data transmission on the first channel according to the transmission waveform.

Regarding the above act 101, determining, by the terminal device, the transmission waveform used by the first channel may be that the terminal device determines the transmission waveform used by the first channel according to at least one of configuration information sent by a network device, a resource pool used by the first channel, and a carrier used by the first channel.

Specifically, the following multiple processing scenarios are included.

Scenario One

If the configuration information indicates a first transmission waveform, the terminal device determines that the first transmission waveform in multiple transmission waveforms is the transmission waveform used by the first channel.

Herein the multiple transmission waveforms are preconfigured on the terminal device or configured by the network device.

The multiple transmission waveforms are two or more transmission waveforms.

The multiple transmission waveforms preconfigured on the terminal device may have no relationship with channels in advance, that is, the terminal device may arbitrarily select one transmission waveform from the multiple transmission waveforms as the transmission waveform of the first channel.

Scenario Two

The terminal device determines the transmission waveform used by the first channel according to the resource pool used by the first channel and a first correspondence relationship, wherein the first correspondence relationship is a correspondence relationship between multiple resource pools and multiple transmission waveforms. The first correspondence relationship is preconfigured on the terminal device or configured by the network device.

It should be understood that, in this scenario, different resource pools adopt different transmission waveforms, a form of a transmission waveform corresponding to a resource pool may be defined through a configuration by the network or a pre-configuration.

Specifically, in V2X, multiple resource pools may be configured through a configuration by the network or a pre-configuration, different resource pools may correspond to different transmission waveforms, a correspondence relationship between the resource pools and the transmission waveforms may be determined through the configuration by the network or the pre-configuration.

When configuration is performed by a network side, the network side may configure transmission waveforms of various resource pools through RRC signaling.

Scenario Three

The terminal device determines the transmission waveform used by the first channel according to the carrier used by the first channel and a second correspondence relationship, wherein the second correspondence relationship is a correspondence relationship between multiple carriers and multiple transmission waveforms, and the second correspondence relationship is preconfigured on the terminal device or configured by the network device.

Specifically, different carriers adopt different transmission waveforms, and a form of a transmission waveform corresponding to a carrier may be defined through a configuration by the network or a pre-configuration.

Multiple carriers may be supported in the V2X, for example, 8 carriers may be supported in the V2X of Rel-15. Different transmission waveforms may be configured for different carriers. For example, considering backward compatibility with terminals of Rel-14 or Rel-15, a transmission waveform of DFT-OFDM is adopted on carriers of the terminals of Rel-14 or Rel-15, a transmission waveform of DFT-OFDM or CP-OFDM may be adopted on other carriers. Which transmission waveform is adopted specifically on which carrier may be determined through the pre-configuration or the configuration by the network.

Another case is that the V2X may work on both a dedicated carrier and an uplink carrier, thus a transmission waveform adopted on the uplink carrier may be the same as that of uplink data, and the same transmission waveform or a different transmission waveform may be adopted on the dedicated carrier.

It should further be pointed out that in the above-mentioned several scenarios, the first channel is a physical sidelink shared channel (PSSCH), or the first channel is a physical sidelink control channel (PSCCH), or the first channel is a physical sidelink feedback channel (PSFCH), or the first channel is a physical sidelink broadcast channel (PSBCH).

Scenario Four

The present implementation provides another approach for determining a transmission waveform used by a channel. The first channel is a physical sidelink shared channel (PSSCH), and a physical sidelink control channel (PSCCH) corresponding to the first channel is a second channel.

Determining, by the terminal device, the transmission waveform used by the first channel, includes that the terminal device determines the transmission waveform used by the first channel according to the second channel. The second channel carries indication information for indicating a second transmission waveform. The transmission waveform adopted by the data channel PSSCH is indicated through the control channel PSCCH.

Which transmission waveform is adopted by the PSCCH may be pre-configured or configured by the network, or determined according to approaches described in the above-mentioned scenarios one to three. Information indicating a transmission waveform of the PSSCH is carried in the PSCCH, and an indication of the transmission waveform of the PSSCH may be implemented in the following modes.

In mode one, indication is performed through explicit information in the PSCCH. Determining, by the terminal device, the transmission waveform used by the first channel according to the second channel, includes: the terminal device determines that the second transmission waveform indicated by the indication information is the transmission waveform used by the first channel. For example, 1-bit information is contained in Sidelink Control Information (SCI) carried by the PSCCH to indicate the transmission waveform of the PSSCH, for example, as shown in the following table.

| Indication information in SCI | Transmission waveform used by PSSCH |
|---|---|
| 0 | CP-OFDM |
| 1 | DFT-OFDM |

It should be understood that the above table is only an example. In fact, it is possible that 0 represents DFT-OFDM and 1 represents CP-OFDM. However, it is not exhaustively enumerated in the present implementation.

It should further be understood that the above table gives an example of indicating two transmission waveforms with 1 bit, and the present implementation is applicable to indicating $2^k$ transmission waveforms with k bits.

In mode two, indication is performed through a Demodulation Reference Signal (DMRS) of the PSCCH. The terminal device determines the transmission waveform used by the first channel according to a third correspondence relationship and at least one of a sequence, a cyclic shift, an orthogonal coverage code (OCC), a resource location, a root sequence of the DMRS corresponding to the second channel, wherein the third correspondence relationship is a correspondence relationship between a transmission waveform and at least one of the sequence, the cyclic shift, the OCC, the resource location, the root sequence of the DMRS.

Herein, the third correspondence relationship is preconfigured on the terminal device, or configured by the network device.

Specifically, different transmission waveforms may be indicated by the sequence, the cyclic shift, the OCC, the resource position, the root sequence of the DMRS. The terminal acquires at least one of the sequence, the cyclic shift, the OCC, the resource position, and the root sequence of the DMRS by detecting the DMRS of the PSCCH, and determines the transmission waveform adopted by the PSSCH corresponding to the PSCCH according to the third correspondence relationship.

In mode three, indication is performed by scrambling code information of the PSCCH. The terminal device determines the transmission waveform used by the first channel according to scrambling code information of the second channel and a fourth correspondence relationship, wherein the fourth correspondence relationship is a correspondence relationship between multiple pieces of scrambling code information and multiple transmission waveforms. The fourth correspondence relationship is preconfigured on the terminal device, or configured by the network device.

That is, SCI information is carried on the PSCCH, a scrambling processing needs to be performed on information bits of the SCI, and transmission waveforms used by the PSSCH may be implicitly indicated by different scrambling code sequences. Herein, a correspondence relationship between different scrambling code information or scrambling code sequences and transmission waveforms is the fourth correspondence relationship.

The terminal acquires scrambling information adopted by the SCI through detecting the SCI carried on the PSCCH, and determines the transmission waveform adopted by the PSSCH corresponding to the PSCCH according to the fourth correspondence relationship.

In mode four, the terminal device determines the transmission waveform used by the first channel according to mask information of the second channel and a fifth correspondence relationship, wherein the fifth correspondence relationship is a correspondence relationship between multiple pieces of mask information and multiple transmission waveforms.

Herein, the fifth correspondence relationship is preconfigured on the terminal device, or configured by the network device.

That is, SCI information is carried on the PSCCH, a masking processing needs to be performed on information bits of the SCI, and transmission waveforms used by the PSSCH may be implicitly indicated by different mask sequences, wherein a correspondence relationship between different mask information or mask sequences and transmission waveforms is the fifth correspondence relationship.

The terminal acquires the mask information adopted by the SCI through detecting the SCI carried on the PSCCH, and determines the transmission waveform adopted by the PSSCH corresponding to the PSCCH according to the fifth correspondence relationship.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Two

An implementation of the present invention provides a data transmission method. As shown in FIG. 3, the method includes acts 101 and 102.

In act 101, a terminal device determines a transmission waveform used by a first channel.

In act 102, the terminal device performs data transmission on the first channel according to the transmission waveform.

Regarding the above act 101, different from implementation one, determining, by the terminal device, the transmission waveform used by the first channel may be that the terminal device determines the transmission waveform used by the first channel according to at least one of configuration information sent by a network device, a resource pool used by the first channel, a carrier used by the first channel, a type of the first channel, and pre-configuration information.

Further, on the basis of the four scenarios provided in implementation one, the present implementation further provides approaches for determining the transmission waveform used by the first channel based on one of the type of the first channel and the pre-configuration information. Specific scenarios are as below.

Scenario Five

The terminal device determines the transmission waveform used by the first channel according to the type of the first channel and a sixth correspondence relationship, wherein the sixth correspondence relationship includes a correspondence relationship between channel types and transmission waveforms.

The type of the first channel includes at least one of a physical sidelink control channel (PSCCH), a physical sidelink shared channel (PSSCH), a physical sidelink feedback channel (PSFCH), and a physical sidelink broadcast channel (PSBCH).

In this scenario, the sixth correspondence relationship may be configured by a network side, or pre-configured on the terminal device.

A mode of the above pre-configuration may be understood as pre-configuration through a protocol definition, or may be pre-configuration through the above pre-configuration information, or may be pre-configuration through information sent from the network side. Herein, pre-configuration through pre-configuration information may be that the terminal device itself configures the pre-configuration information, and the sixth correspondence relationship is determined based on the pre-configuration information. Pre-configuration through the information sent from the network side may be understood as that the network side sends pre-configuration information or configuration information to the terminal device to preconfigure the sixth correspondence relationship on the terminal device.

In addition, configuring, by the network side, the sixth correspondence relationship may be understood as that the network side sends the configuration information to the terminal device, and the sixth correspondence relationship is determined through the configuration information.

That is, the transmission waveform(s) corresponding to at least one channel type may be determined through the configuration information from the network device or through the pre-configuration information by the terminal device. Specifically, different channel types may respectively correspond to different transmission waveforms. Of course, multiple channel types may correspond to the same transmission waveform, and a case in which multiple transmission waveforms corresponding to the same channel type is not excluded.

For example, a correspondence relationship between multiple channel types and multiple transmission waveforms is configured through the configuration of the network side, the protocol definition, or the pre-configuration. For example, it is pre-configured that the PSSCH adopts CP-OFDM and the PSBCH adopts DFT-OFDM. The terminal determines that the PSSCH (i.e., the first channel) adopts a transmission waveform of the CP-OFDM, and the PSBCH adopts a transmission waveform of the DFT-OFDM according to the correspondence relationship. Of course, there may be other correspondence relationships, and it is not exhaustively enumerated herein.

Scenario Six

The terminal device determines the transmission waveform used by the first channel according to the pre-configuration information.

Specifically, the transmission waveform used by the first channel is determined through a protocol definition or a pre-configuration.

For example, through the pre-configuration, it is determined that the PSSCH adopts CP-OFDM, the PSBCH adopts DFT-OFDM, the PSFCH adopts DFT-OFDM, and the PSCCH adopts DFT-OFDM. The terminal device determines the transmission waveform of the first channel according to the pre-configuration information, wherein the first channel is one of the PSCCH, the PSSCH, the PSFCH, or the PSBCH.

It should further be pointed out that in the above-mentioned several scenarios, the first channel is the physical sidelink shared channel (PSSCH), or the first channel is the physical sidelink control channel (PSCCH), or the first channel is the physical sidelink feedback channel (PSFCH), or the first channel is the physical sidelink broadcast channel (PSBCH).

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Three

Figure 4:
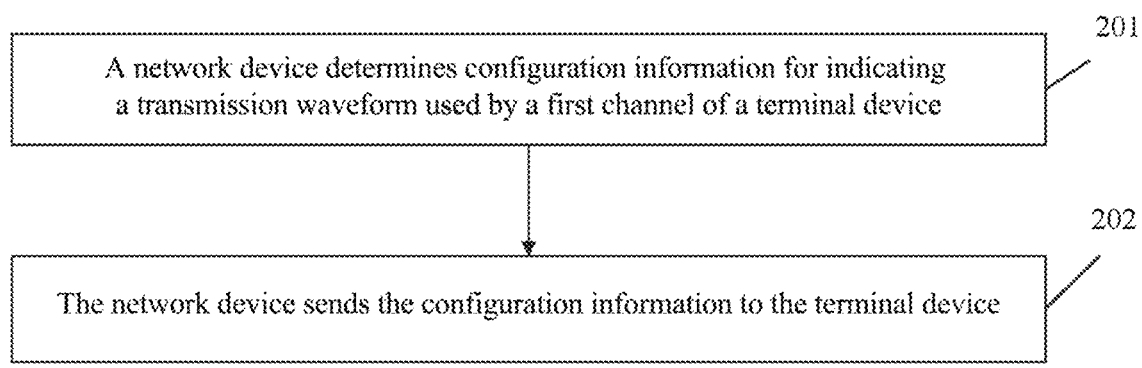
FIG. 4 is a schematic flowchart two of a data transmission method according to an implementation of the present invention.

An implementation of the present invention provides a data transmission method. As shown in FIG. 4, the method includes acts 201 and 202.

In act 201, a network device determines configuration information, wherein the configuration information is used for indicating a transmission waveform used by a first channel of a terminal device.

In act 202, the network device sends the configuration information to the terminal device.

Specifically, the following multiple processing scenarios are included.

Scenario One

The configuration information is used for indicating a first transmission waveform in multiple transmission waveforms.

Herein, the multiple transmission waveforms are preconfigured on the terminal device, or configured by the network device.

The multiple transmission waveforms are two or more transmission waveforms.

If the configuration information indicates the first transmission waveform, the terminal device determines that the first transmission waveform in the multiple transmission waveforms is the transmission waveform used by the first channel.

The multiple transmission waveforms preconfigured on the terminal device may have no relationship with channels in advance, that is, the terminal device may arbitrarily select one transmission waveform from the multiple transmission waveforms as the transmission waveform of the first channel.

Scenario Two

The configuration information is used for indicating a first correspondence relationship, wherein the first correspondence relationship is a correspondence relationship between multiple resource pools and multiple transmission waveforms.

In this scenario, the terminal device determines the transmission waveform used by the first channel according to a resource pool used by the first channel and the first correspondence relationship, wherein the first correspondence relationship is the correspondence relationship between the multiple resource pools and the multiple transmission waveforms. The first correspondence relationship is preconfigured on the terminal device, or configured by the network device.

It should be understood that, in this scenario, different resource pools adopt different transmission waveforms, a form of a transmission waveform corresponding to a resource pool may be defined through a configuration by the network or a pre-configuration.

Specifically, in V2X, multiple resource pools may be configured through the configuration by the network or the pre-configuration, different resource pools may correspond to different transmission waveforms, and a correspondence relationship between the resource pools and the transmission waveforms may be determined through the configuration by the network or the pre-configuration.

When configuration is performed at a network side, the network side may configure transmission waveforms of various resource pools through RRC signaling.

Scenario Three

The configuration information is used for indicating a second correspondence relationship, wherein the second correspondence relationship is a correspondence relationship between multiple carriers and multiple transmission waveforms.

In this scenario, the terminal device determines the transmission waveform used by the first channel according to a carrier used by the first channel and the second correspondence relationship, wherein the second correspondence relationship is the correspondence relationship between the multiple carriers and the multiple transmission waveforms. The second correspondence relationship is preconfigured on the terminal device, or configured by the network device.

Specifically, different carriers adopt different transmission waveforms, and a form of a transmission waveform corresponding to a carrier may be defined through a configuration by the network or a pre-configuration.

Multiple carriers may be supported in the V2X, for example, 8 carriers may be supported in the V2X of Rel-15. Different transmission waveforms may be configured for different carriers. For example, considering backward compatibility with terminals of Rel-14 or Rel-15, a transmission waveform of DFT-OFDM is adopted on carriers of the terminals of Rel-14 or Rel-15, a transmission waveform of DFT-OFDM or CP-OFDM may be adopted on other carriers. Which transmission waveform is adopted specifically on which carrier may be determined through the pre-configuration or the configuration by the network.

Another case is that the V2X can work on both a dedicated carrier and an uplink carrier, thus a transmission waveform adopted on the uplink carrier may be the same as that of uplink data, and the same transmission waveform or a different transmission waveform may be adopted on the dedicated carrier.

It should further be pointed out that in the above-mentioned several scenarios, the first channel is a physical sidelink shared channel (PSSCH), or the first channel is a physical sidelink control channel (PSCCH).

Scenario Four

The present implementation provides another approach for determining a transmission waveform used by a channel. The first channel is a physical sidelink shared channel (PSSCH), and a physical sidelink control channel (PSCCH) corresponding to the first channel is a second channel.

Correspondingly, the terminal device determines the transmission waveform used by the first channel according to the second channel. The second channel carries indication information for indicating a second transmission waveform. The transmission waveform adopted by the data channel PSSCH is indicated through the control channel PSCCH.

Which transmission waveform is adopted by the PSCCH may be pre-configured or configured by the network, or determined according to approaches described in the above-mentioned scenarios one to three. Information indicating a transmission waveform of the PSSCH is carried in the PSCCH, and an indication of the transmission waveform of the PSSCH may be implemented in the following modes.

In mode one, indication is performed through explicit information in the PSCCH. Determining, by the terminal device, the transmission waveform used by the first channel according to the second channel, includes: the terminal device determines that the second transmission waveform indicated by the indication information is the transmission waveform used by the first channel. For example, 1-bit information is contained in Sidelink Control Information (SCI) carried by the PSCCH to indicate the transmission waveform of the PSSCH, for example, as shown in the following table.

| Indication information in SCI | Transmission waveform used by PSSCH |
|---|---|
| 0 | CP-OFDM |
| 1 | DFT-OFDM |

It should be understood that the above table is only an example. In fact, it is possible that 0 represents DFT-OFDM and 1 represents CP-OFDM. However, it is not exhaustively enumerated in the present implementation.

It should further be understood that the above table gives an example of indicating two transmission waveforms with 1 bit, and the present implementation is applicable to indicating $2^k$ transmission waveforms with k bits.

In mode two, indication is performed through a Demodulation Reference Signal (DMRS) of the PSCCH. The configuration information is used for indicating a third correspondence relationship, wherein the third correspondence relationship is a correspondence relationship between a transmission waveform and at least one of a sequence, a cyclic shift, an orthogonal coverage code (OCC), a resource location, a root sequence of the DMRS.

Herein, the third correspondence relationship is preconfigured on the terminal device, or configured by the network device.

Specifically, different transmission waveforms may be indicated by the sequence, the cyclic shift, the OCC, the resource position, the root sequence of the DMRS. The terminal acquires at least one of the sequence, the cyclic shift, the OCC, the resource position, and the root sequence of the DMRS by detecting the DMRS of the PSCCH, and determines the transmission waveform adopted by the PSSCH corresponding to the PSCCH according to the third correspondence relationship.

In mode three, the configuration information is used for indicating a fourth correspondence relationship, wherein the fourth correspondence relationship is a correspondence relationship between multiple pieces of scrambling code information and transmission waveforms.

That is, SCI information is carried on the PSCCH, a scrambling processing needs to be performed on information bits of the SCI, and transmission waveforms used by the PSSCH may be implicitly indicated by different scrambling code sequences. Herein, a correspondence relationship between different scrambling code information or scrambling code sequences and transmission waveforms is the fourth correspondence relationship.

The terminal acquires mask information adopted by the SCI through detecting the SCI carried on the PSCCH, and determines the transmission waveform adopted by the PSSCH corresponding to the PSCCH according to the fourth correspondence relationship.

In mode four, the configuration information is used for indicating a fifth correspondence relationship, wherein the fifth correspondence relationship is a correspondence relationship between multiple pieces of mask information and transmission waveforms.

That is, SCI information is carried on the PSCCH, a masking processing needs to be performed on information bits of the SCI, and transmission waveforms used by the PSSCH may be implicitly indicated by different mask sequences, wherein a correspondence relationship between different mask information or mask sequences and transmission waveforms is the fifth correspondence relationship.

The terminal acquires the mask information adopted by the SCI through detecting the SCI carried on the PSCCH, and determines the transmission waveform adopted by the PSSCH corresponding to the PSCCH according to the fifth correspondence relationship.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Four

An implementation of the present invention provides a data transmission method. As shown in FIG. 4, the method includes acts 201 and 202.

In act 201, a network device determines configuration information, wherein the configuration information is used for indicating a transmission waveform used by a first channel of a terminal device.

In act 202, the network device sends the configuration information to the terminal device.

Different from implementation three, the present implementation further provides the following scenario after the multiple scenarios are provided in implementation three.

Scenario Five

The configuration information is used for indicating a sixth correspondence relationship, wherein the sixth correspondence relationship includes a correspondence relationship between channel types and transmission waveforms.

A type of the first channel includes at least one of a physical sidelink control channel (PSCCH), a physical sidelink shared channel (PSSCH), a physical sidelink feedback channel (PSFCH), and a physical sidelink broadcast channel (PSBCH).

In this scenario, the sixth correspondence relationship is configured by the network device for the terminal device and sent to the terminal device through configuration information. That is, through the configuration information of the network device, a transmission waveform(s) corresponding to at least one channel type may be indicated for the terminal device.

Specifically, different channel types may respectively correspond to different transmission waveforms. Of course, multiple channel types may correspond to the same transmission waveform, and a case in which multiple transmission waveforms corresponding to the same channel type is not excluded.

For example, through the configuration information, the sixth correspondence relationship in which the PSSCH adopts a transmission waveform of the CP-OFDM and the PSBCH adopts a transmission waveform of the DFT-OFDM is indicated for the terminal device.

Correspondingly, the terminal determines that the PSSCH (i.e., the first channel) adopts the transmission waveform of the CP-OFDM, and the PSBCH adopts the transmission waveform of the DFT-OFDM according to the correspondence relationship. Of course, there may be other correspondence relationships, and it is not exhaustively enumerated herein.

When configuration is performed at a network side, the network side may configure transmission waveforms of various resource pools through RRC signaling.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Five

Figure 5:
FIG. 5 is a schematic diagram of structure of a terminal device according to an implementation of the present invention.

An implementation of the present invention provides a terminal device. As shown in FIG. 5, the terminal device includes a first processing unit 31, which determines a transmission waveform used by a first channel, and a first communication unit 32, which performs data transmission on the first channel according to the transmission waveform.

Determining, by the first processing unit 31, the transmission waveform used by the first channel may be that the terminal device determines the transmission waveform used by the first channel according to at least one of configuration information sent by a network device, a resource pool used by the first channel, and a carrier used by the first channel.

Specifically, the following multiple processing scenarios are included.

Scenario One

If the configuration information indicates a first transmission waveform, the first processing unit 31 determines that the first transmission waveform in multiple transmission waveforms is the transmission waveform used by the first channel.

Herein, the multiple transmission waveforms are preconfigured on the terminal device, or configured by the network device.

The multiple transmission waveforms are two or more transmission waveforms.

The multiple transmission waveforms preconfigured on the terminal device may have no relationship with channels in advance, that is, the terminal device may arbitrarily select one transmission waveform from the multiple transmission waveforms as the transmission waveform of the first channel.

Scenario Two

The first processing unit 31 determines the transmission waveform used by the first channel according to the resource pool used by the first channel and a first correspondence relationship, wherein the first correspondence relationship is a correspondence relationship between multiple resource pools and multiple transmission waveforms. The first correspondence relationship is preconfigured on the terminal device, or configured by the network device.

It should be understood that in this scenario, different resource pools adopt different transmission waveforms, and a form of a transmission waveform corresponding to a resource pool may be defined through a configuration by the network or a pre-configuration.

Specifically, in V2X, multiple resource pools may be configured through a configuration by the network or a pre-configuration, different resource pools may correspond to different transmission waveforms, and a correspondence relationship between the resource pools and the transmission waveforms may be determined through the configuration by the network or the pre-configuration.

When configuration is performed at a network side, the network side may configure transmission waveforms of various resource pools through RRC signaling.

Scenario Three

The first processing unit 31 determines the transmission waveform used by the first channel according to the carrier used by the first channel and a second correspondence relationship, wherein the second correspondence relationship is a correspondence relationship between multiple carriers and multiple transmission waveforms. The second correspondence relationship is preconfigured on the terminal device, or configured by the network device.

Specifically, different carriers adopt different transmission waveforms, and a form of a transmission waveform corresponding to a carrier may be defined through a configuration by the network or a pre-configuration.

Multiple carriers may be supported in the V2X, for example, 8 carriers may be supported in the V2X of Rel-15. Different transmission waveforms may be configured for different carriers; For example, considering backward compatibility with terminals of Rel-14 or Rel-15, a transmission waveform of DFT-OFDM is adopted on carriers of the terminals of Rel-14 or Rel-15, a transmission waveform of DFT-OFDM or CP-OFDM may be adopted on other carriers. Which transmission waveform is adopted specifically on which carrier may be determined through the pre-configuration or the configuration by the network.

Another case is that the V2X may work on both a dedicated carrier and an uplink carrier, thus a transmission waveform adopted on the uplink carrier may be the same as that of uplink data, and the same transmission waveform or a different transmission waveform may be adopted on the dedicated carrier.

It should also be pointed out that in the above-mentioned several scenarios, the first channel is a physical sidelink shared channel (PSSCH), or the first channel is a physical sidelink control channel (PSCCH), or the first channel is a physical sidelink feedback channel (PSFCH), or the first channel is a physical sidelink broadcast channel (PSBCH).

Scenario Four

The present implementation provides another approach for determining a transmission waveform used by a channel. The first channel is a physical sidelink shared channel (PSSCH), and a physical sidelink control channel (PSCCH) corresponding to the first channel is a second channel.

The first processing unit 31 determines the transmission waveform used by the first channel according to the second channel. The second channel carries indication information for indicating a second transmission waveform. The transmission waveform adopted by the data channel PSSCH is indicated through the control channel PSCCH.

Which transmission waveform is adopted by the PSCCH may be pre-configured or configured by the network, or determined according to the approaches described in the above-mentioned scenarios one to three. Information indicating a transmission waveform of the PSSCH is carried in the PSCCH, and an indication of the transmission waveform of the PSSCH may be implemented in the following modes.

In mode one, indication is performed through explicit information in the PSCCH. Determining, by the first processing unit 31, the transmission waveform used by the first channel according to the second channel, includes: the terminal device determines that the second transmission waveform indicated by the indication information is the transmission waveform used by the first channel. For example, 1-bit information is contained in Sidelink Control Information (SCI) carried by the PSCCH to indicate the transmission waveform of the PSSCH, for example, as shown in the following table.

| Indication information in SCI | Transmission waveform used by PSSCH |
|---|---|
| 0 | CP-OFDM |
| 1 | DFT-OFDM |

It should be understood that the above table is only an example. In fact, it is possible that 0 represents DFT-OFDM and 1 represents CP-OFDM. However, it is not exhaustively enumerated in the present implementation.

It should further be understood that the above table gives an example of indicating two transmission waveforms with 1 bit, and this implementation is applicable to indicating $2^k$ transmission waveforms with k bits.

In mode two, indication is performed through a Demodulation Reference Signal (DMRS) of the PSCCH. The first processing unit 31 determines the transmission waveform used by the first channel according to a third correspondence relationship and at least one of a sequence, a cyclic shift, an orthogonal coverage code (OCC), a resource location, a root sequence of a DMRS corresponding to the second channel, wherein the third correspondence relationship is a correspondence relationship between a transmission waveform and at least one of the sequence, the cyclic shift, the OCC, the resource location, the root sequence of the DMRS.

Herein, the third correspondence relationship is preconfigured on the terminal device, or configured by the network device.

Specifically, different transmission waveforms may be indicated by the sequence, the cyclic shift, the OCC, the resource position, or the root sequence of the DMRS. The terminal acquires at least one of the sequence, the cyclic shift, the OCC, the resource position, and the root sequence of the DMRS by detecting the DMRS of the PSCCH, and determines the transmission waveform adopted by the PSSCH corresponding to the PSCCH according to the third correspondence relationship.

In mode three, indication is performed by scrambling code information of the PSCCH. The first processing unit 31 determines the transmission waveform used by the first channel according to scrambling code information of the second channel and a fourth correspondence relationship, wherein the fourth correspondence relationship is a correspondence relationship between multiple pieces of scrambling code information and multiple transmission waveforms. The fourth correspondence relationship is preconfigured on the terminal device, or configured by the network device.

That is, SCI information is carried in the PSCCH, a scrambling processing needs to be performed on information bits of the SCI, and transmission waveforms used by the PSSCH may be implicitly indicated by different scrambling code sequences. Herein, a correspondence relationship between different scrambling code information or scrambling code sequences and transmission waveforms is the fourth correspondence relationship.

The terminal acquires mask information adopted by the SCI through detecting the SCI carried on the PSCCH, and determines the transmission waveform adopted by the PSSCH corresponding to the PSCCH according to the fourth correspondence relationship.

In mode four, the first processing unit 31 determines the transmission waveform used by the first channel according to mask information of the second channel and a fifth correspondence relationship, wherein the fifth correspondence relationship is a correspondence relationship between multiple pieces of mask information and multiple transmission waveforms.

Herein, the fifth correspondence relationship is preconfigured on the terminal device, or configured by the network device.

That is, SCI information is carried on the PSCCH, a masking processing needs to be performed on information bits of the SCI, and transmission waveforms used by the PSSCH may be implicitly indicated by different mask sequences, wherein a correspondence relationship between different mask information or mask sequences and transmission waveforms is the fifth correspondence relationship.

The terminal acquires mask information adopted by the SCI through detecting the SCI carried on the PSCCH, and determines the transmission waveform adopted by the PSSCH corresponding to the PSCCH according to the fifth correspondence relationship.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Six

An implementation of the present invention provides a terminal device. As shown in FIG. 5, the terminal device includes a first processing unit 31, which determines a transmission waveform used by a first channel, and a first communication unit 32, which performs data transmission on the first channel according to the transmission waveform.

The first processing unit 31 determines the transmission waveform used by the first channel according to at least one of configuration information sent by a network device, a resource pool used by the first channel, a carrier used by the first channel, a type of the first channel, and pre-configuration information.

Furthermore, on the basis of the four scenarios provided in implementation five, the present implementation further provides approaches for determining the transmission waveform used by the first channel based on one of the type of the first channel and the pre-configuration information. Specific scenarios are as follows.

Scenario Five

The first processing unit 31 determines the transmission waveform used by the first channel according to the type of the first channel and a sixth correspondence relationship, wherein the sixth correspondence relationship includes a correspondence relationship between channel types and transmission waveforms.

The type of the first channel includes at least one of a physical sidelink control channel (PSCCH), a physical sidelink shared channel (PSSCH), a physical sidelink feedback channel (PSFCH), and a physical sidelink broadcast channel (PSBCH).

In this scenario, the sixth correspondence relationship may be configured by a network side or pre-configured on the terminal device.

A mode of the above pre-configuration may be understood as pre-configuration through a protocol definition, or may be pre-configuration through the above pre-configuration information, or may be pre-configuration through information sent from the network side. Herein, pre-configuration through pre-configuration information may be that the terminal device itself configures the pre-configuration information, and the sixth correspondence relationship is determined based on the pre-configuration information. Pre-configuration through the information sent from the network side may be understood as that the network side sends pre-configuration information or configuration information to the terminal device to preconfigure the sixth correspondence relationship on the terminal device.

In addition, configuring, by the network side, the sixth correspondence relationship may be understood as that the network side sends the configuration information to the terminal device, and the sixth correspondence relationship is determined through the configuration information.

That is, the transmission waveform(s) corresponding to at least one channel type may be determined through the configuration information from the network device or through the pre-configuration information by the terminal device. Specifically, different channel types may respectively correspond to different transmission waveforms. Of course, multiple channel types may correspond to the same transmission waveform, and a case in which multiple transmission waveforms corresponding to the same channel type is not excluded.

For example, a correspondence relationship between multiple channel types and multiple transmission waveforms is configured through the configuration of the network side, the protocol definition, or the pre-configuration. For example, it is pre-configured that the PSSCH adopts CP-OFDM and the PSBCH adopts DFT-OFDM. The terminal determines that the PSSCH (i.e., the first channel) adopts a transmission waveform of the CP-OFDM and the PSBCH adopts a transmission waveform of the DFT-OFDM according to the correspondence relationship. Of course, there may be other correspondence relationships, and it is not exhaustively enumerated herein.

Scenario Six

The first processing unit 31 determines the transmission waveform used by the first channel according to the pre-configuration information.

Specifically, the transmission waveform used by the first channel is determined through a protocol definition or a pre-configuration.

For example, through the pre-configuration, it is determined that the PSSCH adopts CP-OFDM, the PSBCH adopts DFT-OFDM, the PSFCH adopts DFT-OFDM, and the PSCCH adopts DFT-OFDM. The terminal device determines the transmission waveform of the first channel according to the pre-configuration information, wherein the first channel is one of the PSCCH, the PSSCH, the PSFCH, or the PSBCH.

It should further be pointed out that in the above-mentioned several scenarios, the first channel is the physical sidelink shared channel (PSSCH), or the first channel is the physical sidelink control channel (PSCCH), or the first channel is the physical sidelink feedback channel (PSFCH), or the first channel is the physical sidelink broadcast channel (PSBCH).

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission by are solved, thus ensuring interaction efficiency of the terminals.

Implementation Seven

Figure 6:
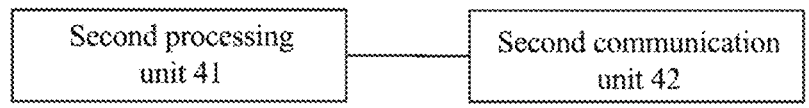
FIG. 6 is a schematic diagram of structure of a network device according to an implementation of the present invention.

An implementation of the present invention provides a network device. As shown in FIG. 6, the network device includes a second processing unit 41, which determines configuration information for indicating a transmission waveform used by a first channel of a terminal device, and a second communication unit 42, which sends the configuration information to the terminal device.

Specifically, the following multiple processing scenarios are included.

Scenario One

The configuration information is used for indicating a first transmission waveform in multiple transmission waveforms.

Herein, the multiple transmission waveforms are preconfigured on the terminal device, or configured by the network device.

The multiple transmission waveforms are two or more transmission waveforms.

The second communication unit 42 configures the multiple transmission waveforms to the terminal device.

If the configuration information indicates a first transmission waveform, the terminal device determines that the first transmission waveform in the multiple transmission waveforms is the transmission waveform used by the first channel.

The multiple transmission waveforms preconfigured on the terminal device may have no relationship with channels in advance, that is, the terminal device may arbitrarily select one transmission waveform from the multiple transmission waveforms as the transmission waveform of the first channel.

Scenario Two

The configuration information is used for indicating a first correspondence relationship, wherein the first correspondence relationship is a correspondence relationship between multiple resource pools and multiple transmission waveforms.

In this scenario, the terminal device determines the transmission waveform used by the first channel according to a resource pool used by the first channel and the first correspondence relationship, wherein the first correspondence relationship is the correspondence relationship between the multiple resource pools and the multiple transmission waveforms. The first correspondence relationship is preconfigured on the terminal device, or configured by the network device.

It should be understood that, in this scenario, different resource pools adopt different transmission waveforms, a form of a transmission waveform corresponding to a resource pool may be defined through a configuration by the network or a pre-configuration.

Specifically, in V2X, multiple resource pools may be configured through the configuration by the network or the pre-configuration, different resource pools may correspond to different transmission waveforms, and a correspondence relationship between the resource pools and the transmission waveforms may be determined through the configuration by the network or the pre-configuration.

When configuration is performed at a network side, the network side may configure a transmission waveforms of various resource pools through RRC signaling.

Scenario Three

The configuration information is used for indicating a second correspondence relationship, wherein the second correspondence relationship is a correspondence relationship between multiple carriers and multiple transmission waveforms.

In this scenario, the terminal device determines the transmission waveform used by the first channel according to a carrier used by the first channel and the second correspondence relationship, wherein the second correspondence relationship is the correspondence relationship between the multiple carriers and the multiple transmission waveforms. The second correspondence relationship is preconfigured on the terminal device, or configured by the network device.

Specifically, different carriers adopt different transmission waveforms, and a form of a transmission waveform corresponding to a carrier may be defined through a configuration by the network or a pre-configuration.

Multiple carriers may be supported in the V2X, for example, 8 carriers may be supported in the V2X of Rel-15. Different transmission waveforms may be configured for different carriers. For example, considering backward compatibility with terminals of Rel-14 or Rel-15, a transmission waveform of DFT-OFDM is adopted on carriers of the terminals of Rel-14 or Rel-15, a transmission waveform of DFT-OFDM or CP-OFDM may be adopted on other carriers. Which transmission waveform is adopted specifically on which carrier may be determined through the pre-configuration or the configuration by the network.

Another case is that the V2X can work on both a dedicated carrier and an uplink carrier, thus a transmission waveform adopted on the uplink carrier may be the same as that of uplink data, and the same transmission waveform or a different transmission waveform may be adopted on the dedicated carrier.

It should further be pointed out that in the above-mentioned several scenarios, the first channel is a physical sidelink shared channel (PSSCH), or the first channel is a physical sidelink control channel (PSCCH), or the first channel is a physical sidelink feedback channel (PSFCH), or the first channel is a physical sidelink broadcast channel (PSBCH).

Scenario Four

The present implementation provides another approach for determining a transmission waveform used by a channel, wherein the first channel is a physical sidelink shared channel (PSSCH), and a physical sidelink control channel (PSCCH) corresponding to the first channel is a second channel.

Correspondingly, the terminal device determines the transmission waveform used by the first channel according to the second channel. The second channel carries indication information for indicating a second transmission waveform. The transmission waveform adopted by the data channel PSSCH is indicated through the control channel PSCCH.

Which transmission waveform is adopted by the PSCCH may be pre-configured or configured by the network, or determined according to the approaches described in the above-mentioned scenarios one to three. Information indicating a transmission waveform of the PSSCH is carried in the PSCCH, and an indication of the transmission waveform of the PSSCH may be implemented in the following modes.

In mode one, indication is performed through explicit information in the PSCCH. Determining, by the terminal device, the transmission waveform used by the first channel according to the second channel, includes: the terminal device determines that the second transmission waveform indicated by the indication information is the transmission waveform used by the first channel. For example, 1-bit information is contained in Sidelink Control Information (SCI) carried by the PSCCH to indicate the transmission waveform of the PSSCH, for example, as shown in the following table.

| Indication information in SCI | Transmission waveform used by PSSCH |
|---|---|
| 0 | CP-OFDM |
| 1 | DFT-OFDM |

It should be understood that the above table is only an example. In fact, it is possible that 0 represents DFT-OFDM and 1 represents CP-OFDM. However, it is not exhaustively enumerated in the present implementation.

It should be understood that the above table gives an example of indicating two transmission waveforms with 1 bit, and the present implementation is applicable to indicating $2^k$ transmission waveforms with k bits.

In mode two, indication is performed through a Demodulation Reference Signal (DMRS) of the PSCCH. The configuration information is used for indicating a third correspondence relationship, wherein the third correspondence relationship is a correspondence relationship between a transmission waveform and at least one of a sequence, a cyclic shift, an orthogonal coverage code (OCC), a resource location, and a root sequence of the DMRS.

Herein, the third correspondence relationship is preconfigured on the terminal device, or configured by the network device.

Specifically, different transmission waveforms may be indicated by the sequence, the cyclic shift, the OCC, the resource position, the root sequence of the DMRS. The terminal acquires at least one of the sequence, the cyclic shift, the OCC, the resource position, and the root sequence of the DMRS by detecting the DMRS of the PSCCH, and determines the transmission waveform adopted by the PSSCH corresponding to the PSCCH according to the third correspondence relationship.

In mode three, the configuration information is used for indicating a fourth correspondence relationship, wherein the fourth correspondence relationship is a correspondence relationship between multiple pieces of scrambling code information and transmission waveforms.

That is, SCI information is carried on the PSCCH, a scrambling processing needs to be performed on information bits of the SCI, and transmission waveforms used by the PSSCH may be implicitly indicated by different scrambling code sequences. Herein, a correspondence relationship between different scrambling code information or scrambling code sequences and transmission waveforms is the fourth correspondence relationship.

The terminal acquires mask information adopted by the SCI through detecting the SCI carried on the PSCCH, and determines the transmission waveform adopted by the PSSCH corresponding to the PSCCH according to the fourth correspondence relationship.

In mode four, the configuration information is used for indicating a fifth correspondence relationship, wherein the fifth correspondence relationship is a correspondence relationship between multiple pieces of mask information and transmission waveforms.

That is, SCI information is carried on the PSCCH, a masking processing needs to be performed on information bits of the SCI, and transmission waveforms used by the PSSCH may be implicitly indicated by different mask sequences, wherein a correspondence relationship between different mask information or mask sequences and transmission waveforms is the fifth correspondence relationship.

The terminal acquires the mask information adopted by the SCI through detecting the SCI carried on the PSCCH, and determines the transmission waveform adopted by the PSSCH corresponding to the PSCCH according to the fifth correspondence relationship.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Implementation Eight

An implementation of the present invention provides a network device. As shown in FIG. 6, the network device includes a second processing unit 41, which determines configuration information, wherein the configuration information is used for indicating a transmission waveform used by a first channel of a terminal device, and a second communication unit 42, which sends the configuration information to the terminal device.

The present implementation further provides the following scenario after the multiple scenarios are provided in implementation seven.

Scenario Five

The configuration information is used for indicating a sixth correspondence relationship, wherein the sixth correspondence relationship includes a correspondence relationship between channel types and transmission waveforms.

A type of the first channel includes at least one of a physical sidelink control channel (PSCCH), a physical sidelink shared channel (PSSCH), a physical sidelink feedback channel (PSFCH), and a physical sidelink broadcast channel (PSBCH).

In this scenario, the sixth correspondence relationship is configured by the network device for the terminal device and sent to the terminal device through configuration information. That is, through the configuration information of the network device, a transmission waveform(s) corresponding to at least one channel type may be indicated for the terminal device.

Specifically, different channel types may respectively correspond to different transmission waveforms. Of course, multiple channel types may correspond to the same transmission waveform, and a case in which multiple transmission waveforms corresponding to the same channel type is not excluded.

For example, through the configuration information, the sixth correspondence relationship in which the PSSCH adopts a transmission waveform of the CP-OFDM and the PSBCH adopts a transmission waveform of the DFT-OFDM is indicated for the terminal device.

Correspondingly, the terminal determines the PSSCH (i.e., the first channel) adopts the transmission waveform of the CP-OFDM, and the PSBCH adopts the transmission waveform of the DFT-OFDM according to the correspondence relationship. Of course, there may be other correspondence relationships, and it is not exhaustively enumerated herein.

When configuration is performed at a network side, the network side may configure transmission waveforms of various resource pools through RRC signaling.

It can be seen that by adopting the above solution, when a terminal device performs data transmission through a channel, a transmission waveform corresponding to the channel can be determined in advance, and then channel transmission can be performed based on the selected transmission waveform, such that problems how to select a transmission waveform by a sending end and how to know, by a receiving end, which transmission waveform is adopted by the sending end for data transmission are solved, thus ensuring interaction efficiency of the terminals.

Figure 7:
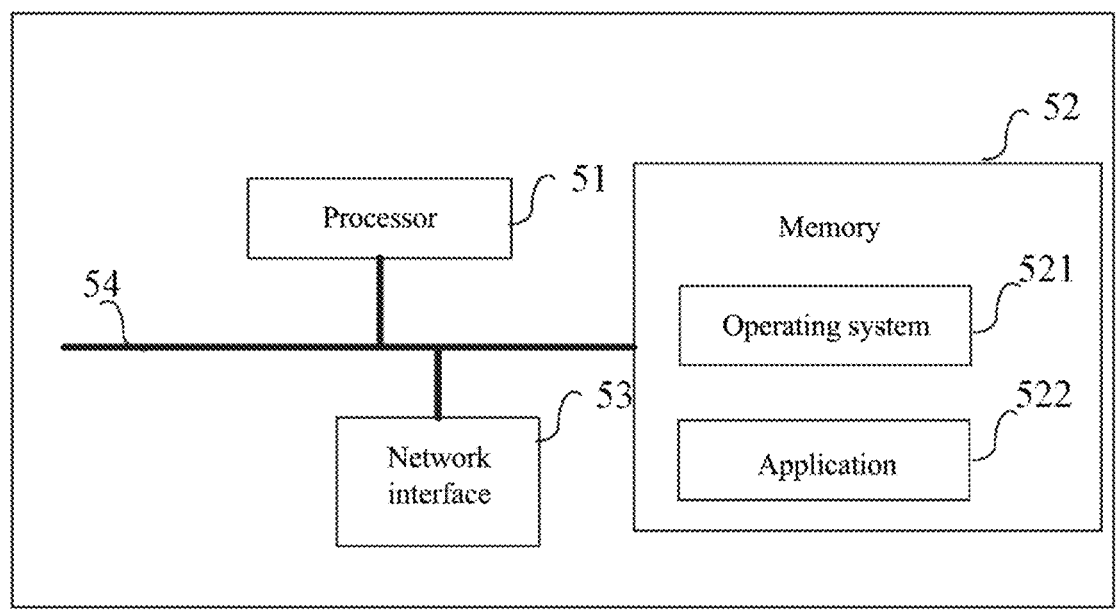
FIG. 7 is a schematic diagram of a hardware architecture according to an implementation of the present invention.

An implementation of the present invention further provides a hardware composition architecture of a terminal device or a network device, which includes at least one processor 51, a memory 52, and at least one network interface 53, as shown in FIG. 7. Various components are coupled together by a bus system 54. It may be understood that the bus system 54 is used for implementing connection and communication between these components. In addition to a data bus, the bus system 54 includes a power bus, a control bus, and a status signal bus. However, for clarity, all kinds of buses are uniformly referred to as a bus system 54 in the FIG. 7.

It should be understood that the memory 52 in the implementation of the present invention may be a volatile memory or a non-volatile memory, or may include both volatile and non-volatile memory.

In some implementations, the memory 52 stores the following elements, executable modules or data structures, or subsets thereof, or extended sets thereof: an operating system 521 and an application 522.

Herein, the processor 51 is configured to be capable of processing acts in the method in any one of the implementations one to four, which is not repeated herein.

An implementation of the present invention provides a computer storage medium, the computer storage medium stores computer executable instructions, and when the computer executable instructions are executed, the acts in the method of any one of the implementations one to four are implemented.

The above device in the implementations of the present invention may be stored in a computer readable storage medium when it is implemented in a form of a software function module and sold or used as an independent product. Based on this understanding, technical solutions in the implementations of the present invention, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present invention. The aforementioned storage medium includes various media capable of storing program codes, such as a U disk, a mobile hard disk, a read-only memory (ROM), a magnetic disk or an optical disk. Thus, the implementations of the present invention are not limited to any specific combination of hardware and software.

Correspondingly, an implementation of the present invention further provides a computer storage medium in which a computer program is stored, and the computer program is configured for execution of the data transmission method in the implementations of the present invention.

Although exemplary implementations of the present invention have been disclosed for illustrative purposes, those skilled in the art will recognize that various modifications, additions and substitutions are also possible, and therefore, the scope of the present invention should not be limited to the above implementations.

What we claim is:

1. A data transmission method, comprising:
   determining, by a terminal device, a transmission waveform of a first channel according to a second channel; and
   performing, by the terminal device, data transmission on the first channel according to the transmission waveform;
   wherein the first channel is a physical sidelink shared channel (PSSCH), and second channel is a physical sidelink control channel (PSCCH);
   wherein determining, by the terminal device, the transmission waveform of the first channel according to the second channel comprises:
   determining, by the terminal device, the transmission waveform of the first channel according to a correspondence relationship and a sequence of demodulation reference signal (DMRS) corresponding to the second channel, wherein the correspondence relationship is a correspondence relationship between a plurality of transmission waveforms and a plurality of sequences of DMRS.

2. The method of claim 1, wherein the correspondence relationship is preconfigured on the terminal device or configured by a network device.

3. A terminal device, comprising a processor and a network interface, wherein
   the processor is configured to determine a transmission waveform of a first channel according to a second channel; and
   the network interface is configured to perform data transmission on the first channel according to the transmission waveform;
   wherein the first channel is a physical sidelink shared channel (PSSCH), and second channel is a physical sidelink control channel (PSCCH);
   wherein the processor is configured to determine the transmission waveform of the first channel according to a correspondence relationship and a sequence of demodulation reference signal (DMRS) corresponding to the second channel, wherein the correspondence relationship is a correspondence relationship between a plurality of transmission waveforms and a plurality of sequences of DMRS.

4. The method of claim 1, wherein the correspondence relationship is preconfigured on the terminal device or configured by a network device.

* * * * *